United States Patent
Adachi et al.

(10) Patent No.: US 6,560,012 B2
(45) Date of Patent: May 6, 2003

(54) MICROSCOPE APPARATUS AND METHOD

(75) Inventors: Sadashi Adachi, Hachioji (JP); Atsushi Yonetani, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/948,625

(22) Filed: Sep. 10, 2001

(65) Prior Publication Data

US 2002/0030883 A1 Mar. 14, 2002

(30) Foreign Application Priority Data

Sep. 12, 2000 (JP) ........................................ 2000-276219

(51) Int. Cl.$^7$ .............................................. G02B 21/00
(52) U.S. Cl. ........................ 359/368; 359/227; 359/363; 359/381; 359/740
(58) Field of Search ................................... 359/383, 379, 359/387, 384, 381, 368, 740, 738, 739, 227, 229, 363; 250/201.3, 216, 548

(56) References Cited

U.S. PATENT DOCUMENTS

| 5,566,020 A | 10/1996 | Bradford et al. |
| 5,847,866 A | * 12/1998 | Otaki .......................... 359/368 |
| 6,075,646 A | 6/2000 | Suzuki |
| 6,097,538 A | 8/2000 | Watanabe et al. |
| 6,246,832 B1 | * 2/2001 | Terada .......................... 396/63 |

FOREIGN PATENT DOCUMENTS

| JP | 58-144809 | 8/1983 |
| JP | 10-206741 | 8/1998 |

* cited by examiner

*Primary Examiner*—Mark A. Robinson
(74) *Attorney, Agent, or Firm*—Arnold International; Bruce Y. Arnold

(57) ABSTRACT

Microscope apparatus and a method are disclosed for avoiding a reduction in intensity at the periphery of a microscope image that is detected by an electronic image-detector and then displayed. The method includes inserting one or more stops along the optical axis of the microscope, said stop(s) having a central transmissive region and a blocking region outside the central transmissive region; and positioning at least one stop so as to simultaneously block peripheral portions of axial and abaxial light fluxes from a sample under observation from being incident onto the electronic image detector, thereby making the axial and abaxial light fluxes that are incident onto the electronic image detector substantially equal in detected brightness. The apparatus disclosed is for implementing the method, and includes a relay optical system, a middle barrel of a microscope, and one or more stops as described above which simultaneously block peripheral portions of axial and abaxial light fluxes from a sample under observation from being passed by the middle barrel.

7 Claims, 9 Drawing Sheets

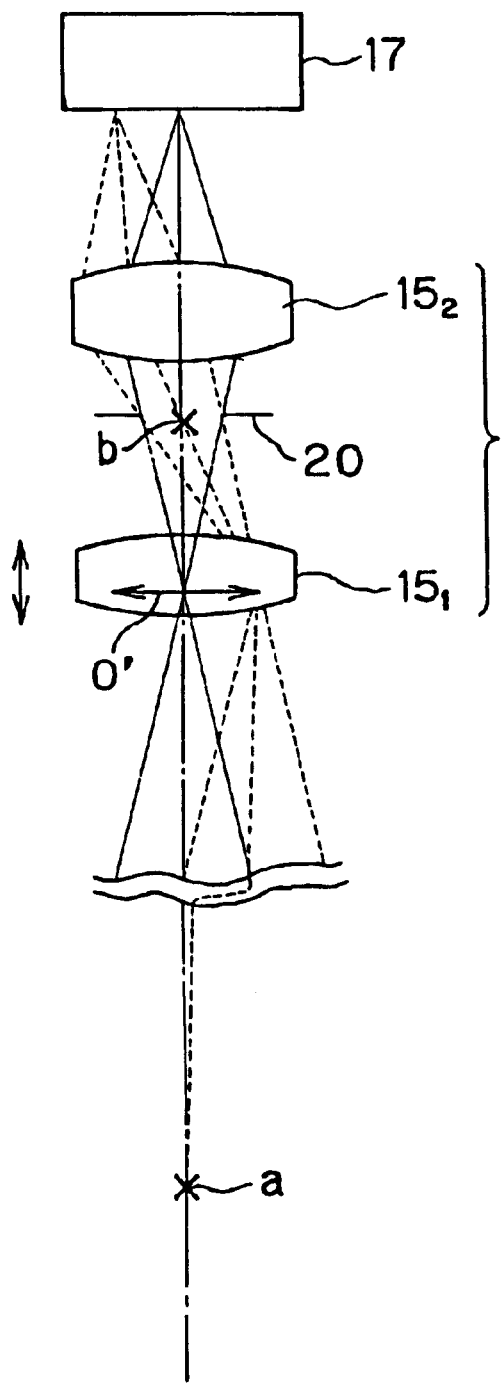
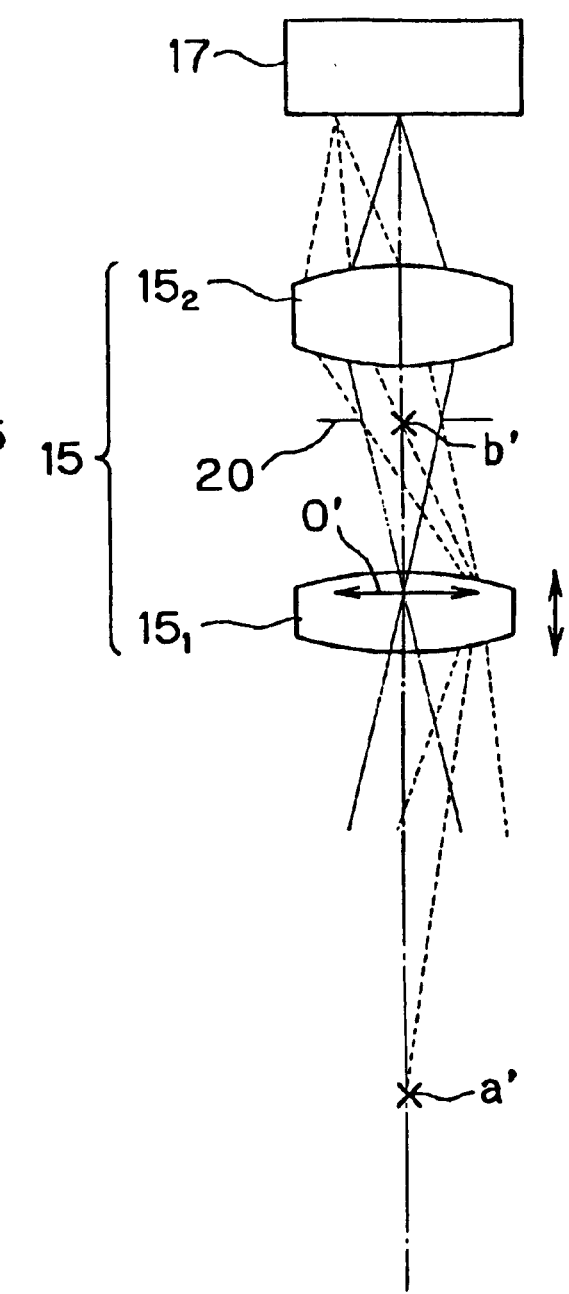
Fig. 6A                    Fig. 6B

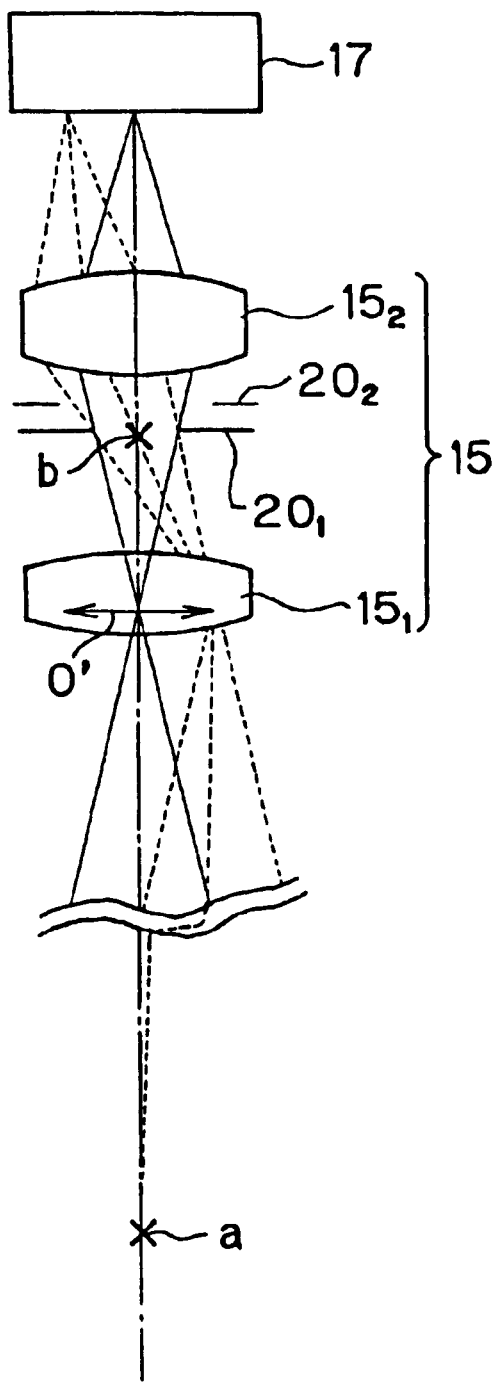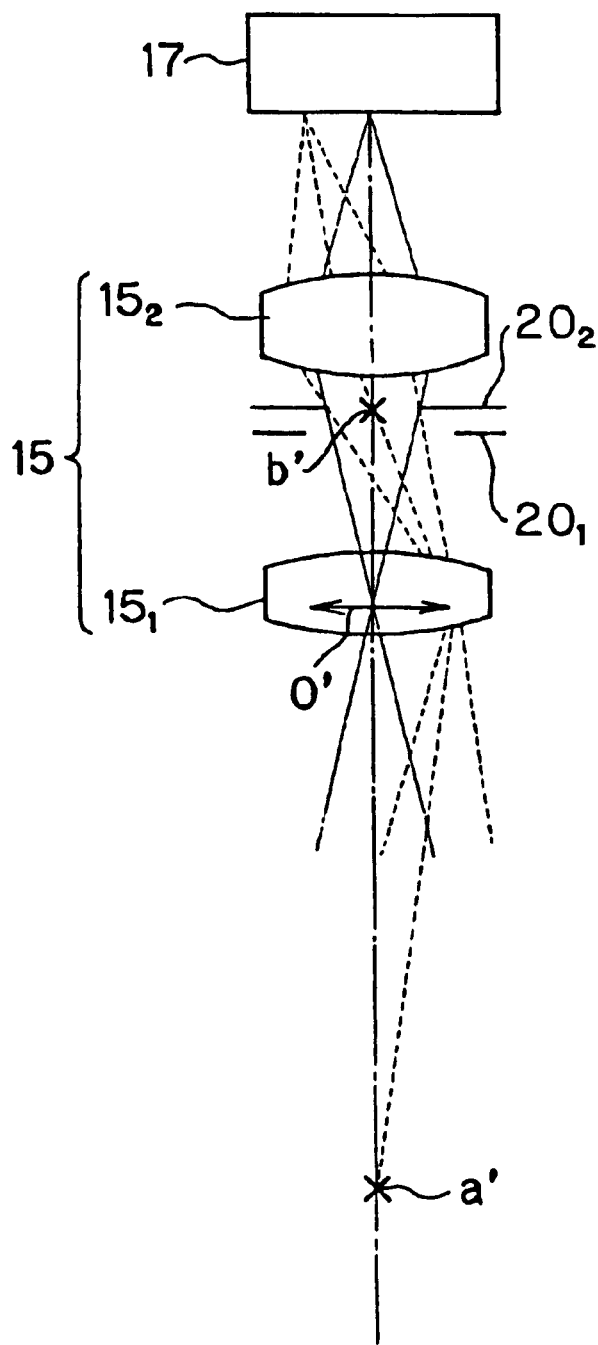
Fig. 7A
Fig. 7B

MICROSCOPE APPARATUS AND METHOD

BACKGROUND OF THE INVENTION

Microscopy systems in which a microscope is provided with an electronic camera having an electronic image-detecting device, such as a CCD array that is used to capture images of a sample for electronic display, have come to be increasingly used. For instance, Japanese Laid-Open Patent Application H8-190056 relates to this kind of system. Electronic image-detecting devices such as CCD arrays have a tendency to be less sensitive to light flux that is incident obliquely, and the larger the angle of incidence, the less sensitive they become. Therefore, a so-called "shading" phenomenon occurs, in which displayed images from such image-detecting devices tend to have dark peripheral areas and thus uneven brightness over the field of view.

BRIEF SUMMARY OF THE INVENTION

The present invention relates to: (1) a microscope middle barrel having an optical relay system, and relates, in particular, to a middle barrel for relaying enlarged images of a sample onto an electronic image-detecting device; (2) a microscope provided with such an optical relay system; and (3) a method of using these apparatus.

The object of the invention is to provide electronically displayed images without brightness artifacts causing uneven brightness over the field of view in the situation where an electronic image-detecting device, such as a CCD array, has been used to detect the images formed by a microscope.

A middle barrel for achieving the object of the invention includes a mount for connecting an electronic image-detecting device, a mount for connecting a microscope, an optical relay system for relaying images onto the electronic image-detecting device, and a control member having a transmissive region which transmits light and a shading region which blocks light, with the control member being used to make the detected images have a more uniform brightness over the field of view.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 6A and 6B show optical paths through a middle barrel portion of a microscope in the case of using an objective lens system having an exit pupil at a (FIG. 6A) and one having an exit pupil at a' (FIG. 6B) for preventing brightness artifacts from occurring in the field of view by providing a movable field lens in the middle barrel portion;

FIGS. 7A and 7B show optical paths through a middle barrel portion of a microscope in the case of using an objective lens system having an exit pupil at a (FIG. 7A) and one having an exit pupil at a' (FIG. 7B) for preventing brightness artifacts from occurring in the field of view by providing plural diaphragms in the middle barrel portion;

DETAILED DESCRIPTION

The microscope according to the present invention is characterized by the fact that it includes an optical imaging system for forming an intermediate image of a sample, an optical relay system for relaying the intermediate image onto an electronic image-detecting device, and a control member for controlling brightness artifacts in the detected electronic image. The present invention uses the control member for controlling the light flux that is incident onto the center region versus the periphery of an electronic image-detecting device so as to avoid a decrease in image brightness that otherwise occurs at the periphery of the detected image when using, for example, a CCD array to detect the image. More specifically, the control member is used to avoid a decrease in image brightness that normally occurs in electronically displayed images which have been captured with electronic image-detecting devices. Reduced brightness artifacts usually occur at the periphery of such images, and are caused both by the optical imaging system and by the electronic image-detecting device. When the microscope objective lens system is changed so as to provide a different magnification of an object being observed, the control member can be adjusted according to which objective lens system is in use so that the brightness level of the image field in both the central and peripheral regions is more uniform, while providing excellent resolution and contrast in the detected images.

The operation of a microscope which uses the present invention to improve the quality of detected electronic images that are then displayed to one or more viewers will now be described with reference to FIGS. 3A and 3B.

Figure 3B:
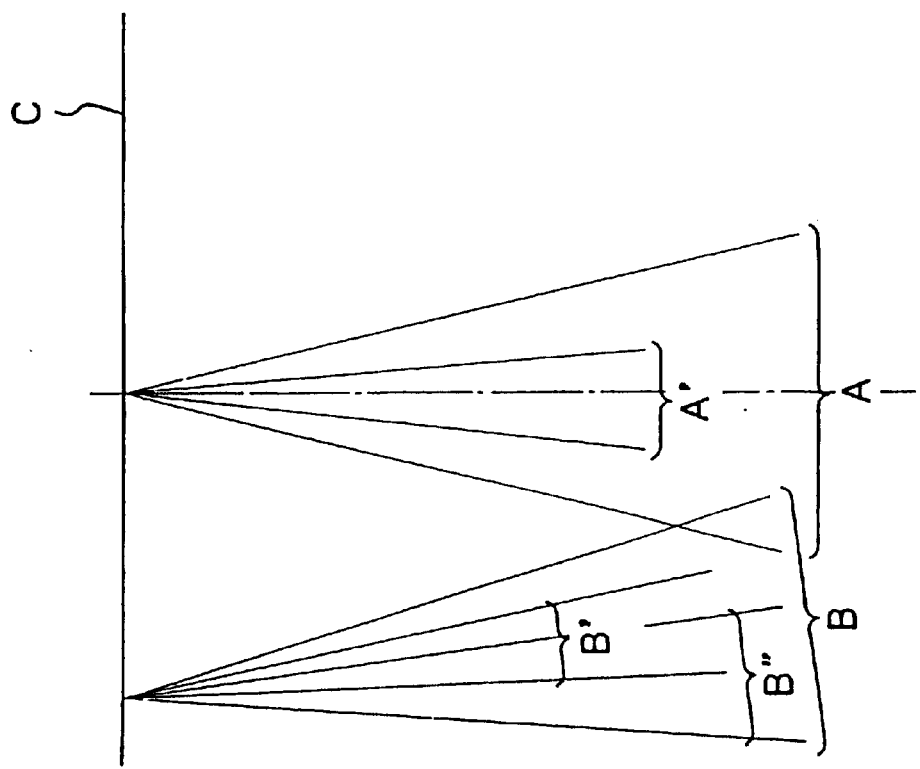
FIGS. 3A and 3B illustrate ray paths for explaining the principle of operation of the microscope according to the present invention.
Figure 3A:
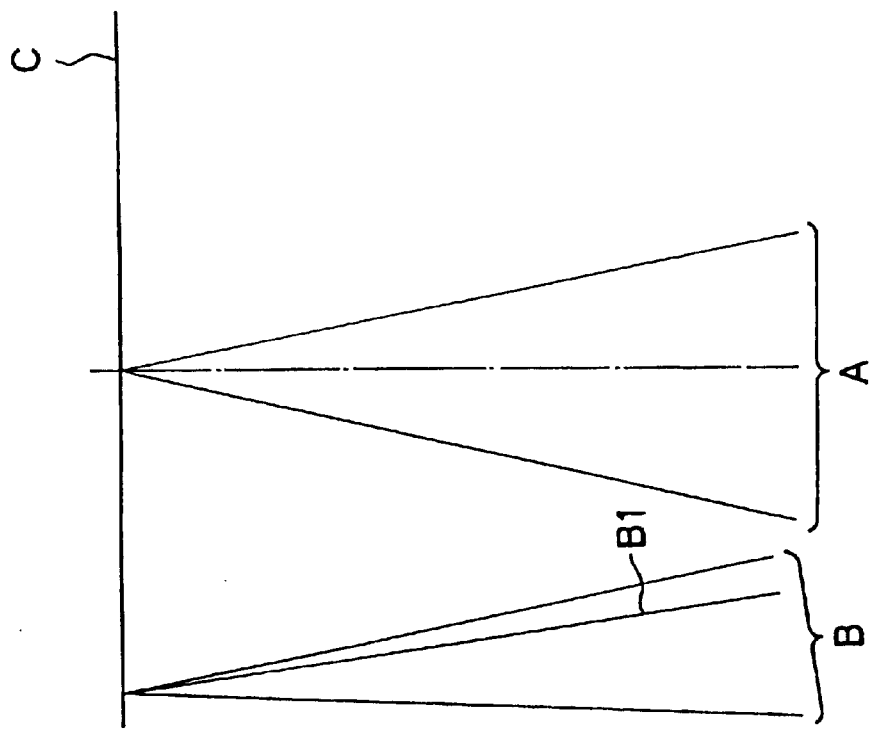

FIG. 3A shows light fluxes that are focused onto an image-detecting surface C by an optical relay system after preliminarily having been formed into an intermediate image. In FIG. 3A, the light flux indicated by A is axial and the light flux indicated by B is abaxial. The axial light flux A includes a main light ray (illustrated by the dashed line) which falls onto the image plane at normal incidence, and an accompanying cone of converging light rays, as is shown in the figure. Conversely, the abaxial light flux B includes a main light ray (chief ray) B1 within a converging cone of light rays. The main light ray B1 is incident onto the image plane at an oblique angle, as is shown in the figure. The abaxial (i.e., off-axis) light flux B is usually subject to vignetting so that the main light ray B1 does not lie at the center of the converging cone of light rays, but instead lies closer to the inner border, as shown. In addition, the vignetting makes the numerical aperture of the abaxial light flux B smaller than that of the axial light flux A. When the abaxial light flux B is incident onto an image-detecting surface C of an electronic camera mounted in a microscope, it is not only incident onto the image-detecting surface C obliquely, but also has a smaller numerical aperture than the axial light flux A. Therefore, the detected images tend to suffer from unevenness in brightness artifacts, called shading, in which the area at the periphery of the image is darker in comparison to the area at the center of the image. These artifacts are undesirable in that they detract from the object under examination being accurately represented visually by the displayed image.

To avoid this, in the present invention, at least one diaphragm is advantageously placed along the optical axis within the optical relay system so as to simultaneously block the outer rays of the axial and abaxial light fluxes A and B. Thus, referring to FIG. 3B, of the light flux A, only the smaller cone angle of light rays A' is transmitted to the image-detecting surface C; and, of the light flux B only the smaller cone angle of light rays B' or B" is transmitted to the image-detecting surface C. In this way, the axial and abaxial light fluxes are made to have nearly the same numerical aperture, thereby reducing the difference in brightness between the central and peripheral areas.

As is apparent from FIG. 3B, the abaxial light fluxes B' and B" have different angles of incidence onto the image-detecting surface C, with the rays of light flux B" being closer to normal incidence onto the surface than the rays of light flux B'. Therefore, the light flux B" is more advantageous, since the rays of this light flux are more nearly normal to the image-detecting surface, thereby making the detection of these rays less influenced by the falling sensitivity of electronic image-detecting devices to rays that are incident at oblique angles.

Figure 1:
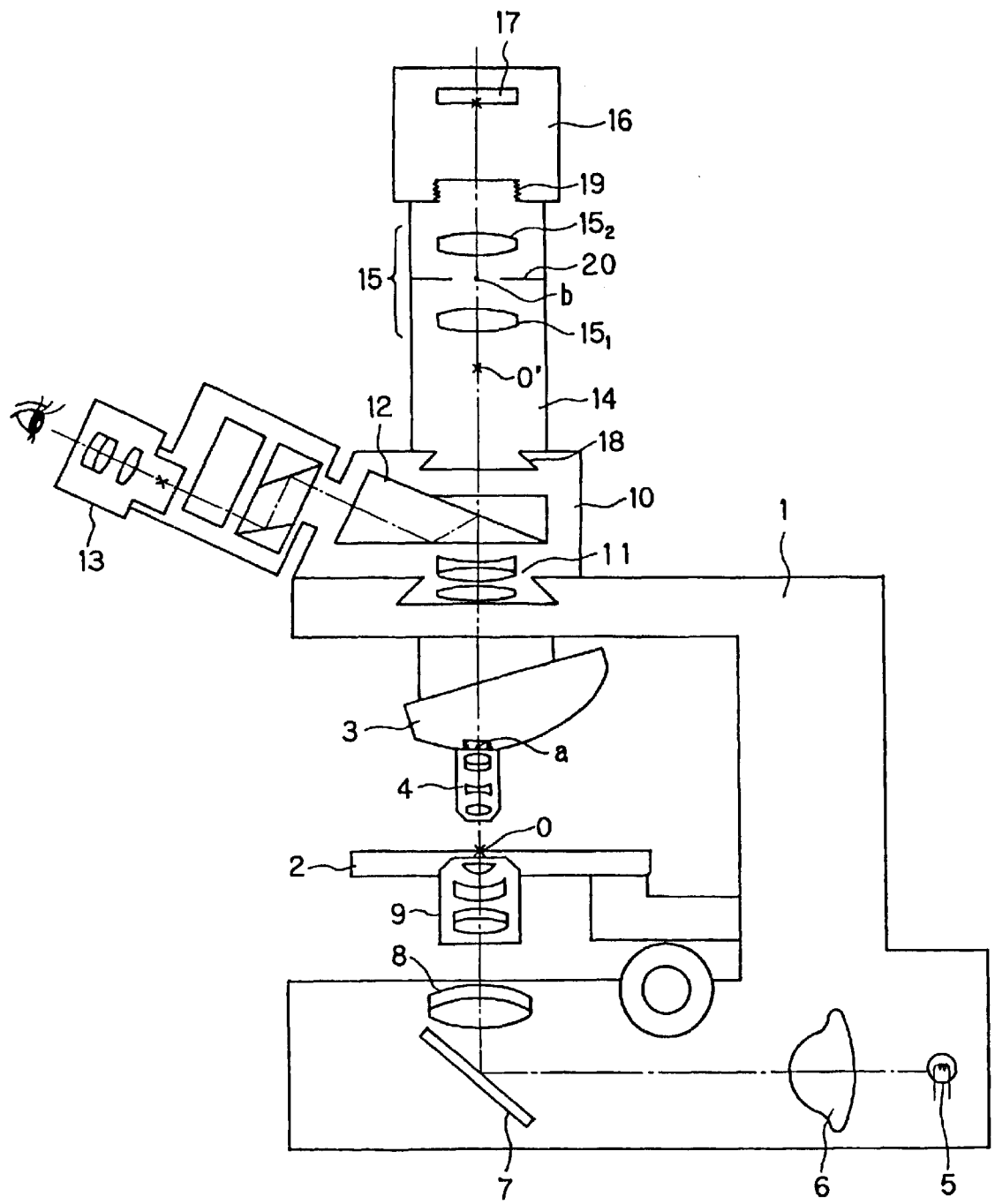
FIG. 1 shows the construction of Embodiment 1 of a microscope according to the present invention.
Figure 2:
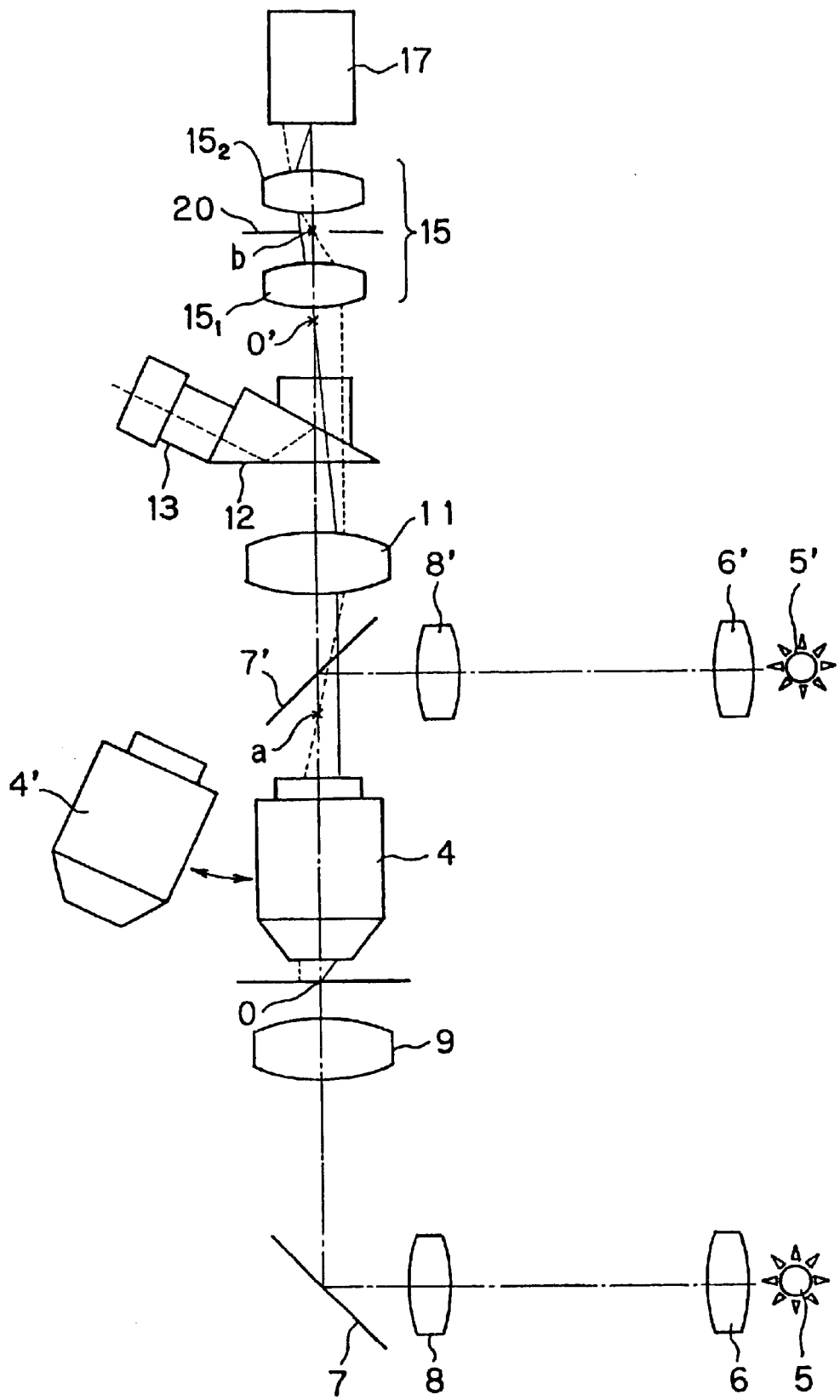
FIG. 2 shows the optical paths of Embodiment 1, as well as the optical path of an alternative illumination optical system for viewing a sample in reflected light.

FIG. 1 shows the construction of an embodiment of the microscope according to the present invention, and FIG. 2 shows equivalent light paths for two ways to illuminate the object, one way of which is illustrated in FIG. 1.

The construction of the microscope will now be described, with reference to FIG. 1. A microscope body 1 is provided with a stage 2 for mounting a sample O (such as a specimen) to be observed in transmitted light, and with a revolver 3 for interchangeably fixing an objective lens system 4 above the stage 2. Below these components are provided a light source 5 and an optical illumination system that is formed of a collection lens 6, a mirror 7 for folding the light path, and an auxiliary lens 8 for guiding light flux from the light source 5 to a condenser lens 9 that is fixed at the lower part of the stage. Above the microscope body 1, an eyepiece unit 10, a middle barrel 14, and an imaging unit 16 are detachably mounted. The eyepiece unit 10 includes an imaging lens 11 that forms an intermediate image with light flux that, after being converged by the imaging lens 11, is reflected by a beamsplitter prism 12 so as to form an image (not illustrated) that may be viewed by looking through the ocular 13. Part of the light from the objective lens system 4 and imaging lens 11 is transmitted by the beamsplitter prism 12 and forms an image of the sample O at O' along the optical axis within the middle barrel 14. The objective lens system 4 images the sample O at infinity, and the imaging lens 11 images this light at position O' along the optical axis within the middle barrel 14. The middle barrel 14 includes a relay lens system 15, formed of two positive lenses $15_1$ and $15_2$, for relaying the image O' onto the detecting surface of an electronic image-detecting device 17 (for instance, a CCD array) in the imaging unit 16. The middle barrel 14 has a lower mount 18 and an upper mount 19. The lower mount 18 (a dovetail) is used to detachably mount the middle barrel to the eyepiece unit 10, which in turn is mounted to the microscope body 1, and the upper mount 19 is used to detachably mount the imaging unit 16 to the middle barrel 14. In this embodiment, the lower mount 18 is a round dovetail and the upper mount 19 is a C mount. These are connecting structures generally used in microscopes.

The construction described above is the same as that of a conventional microscope having a means to display images that are detected by an electronic image-detecting device. As shown in FIG. 2, the sample O may instead be observed in reflected light by having light from a light source 5' illuminate the specimen via a collection lens 6', auxiliary lens 8', half-mirror 7' and one of the objective lens systems 4, 4', in lieu of using the components 5–9.

In this construction, where the objective lens system 4 has an exit pupil at a, as illustrated in FIG. 2, an image b of this exit pupil is formed at a point nearer the image-detecting device 17 than the sample image O'. In FIGS. 1 and 2, the relay lens system 15 is formed of the two positive lenses $15_1$ and $15_2$. The image b of the exit pupil a of the objective lens system 4 is formed between these two positive lenses, by the combined action of imaging lens 11 and relay lens $15_1$, thereby forming a secondary pupil position at b. In FIG. 2, a light ray from the center of the sample O (i.e., an axial light ray) is shown by the solid line and a light ray from the periphery of the sample O (i.e., an abaxial light ray) is shown by the dotted line.

According to the present invention, a diaphragm 20 is positioned along the optical axis at or near the secondary pupil b. The diaphragm 20 simultaneously blocks the peripheral rays of both the axial and abaxial light fluxes, thereby providing reduced cone angles of rays that are transmitted with the same numerical aperture as illustrated in FIG. 3B. Therefore, unevenness in brightness in the detected images is greatly reduced. Hereinafter, "unevenness in brightness in the detected images" will simply be referred to as "unevenness in brightness". Diaphragm 20 is preferably located at the position b where the relay lens system 15 is telecentric to the rays from the sample O. In the figure, the diaphragm 20 is placed at the front focal plane of the positive lens $15_2$. In this way, the abaxial light flux takes the form of the light flux B", illustrated in FIG. 3B. Thus, light is incident onto the image-detecting device 17 at angles that are nearer normal incidence. Here, the unevenness of brightness does not necessarily occur symmetrically centered on the optical axis. Therefore, it is desirable that the diaphragm 20 can be placed off-center relative to the optical axis, i.e., be moveable in a plane perpendicular to the optical axis.

Figure 4:
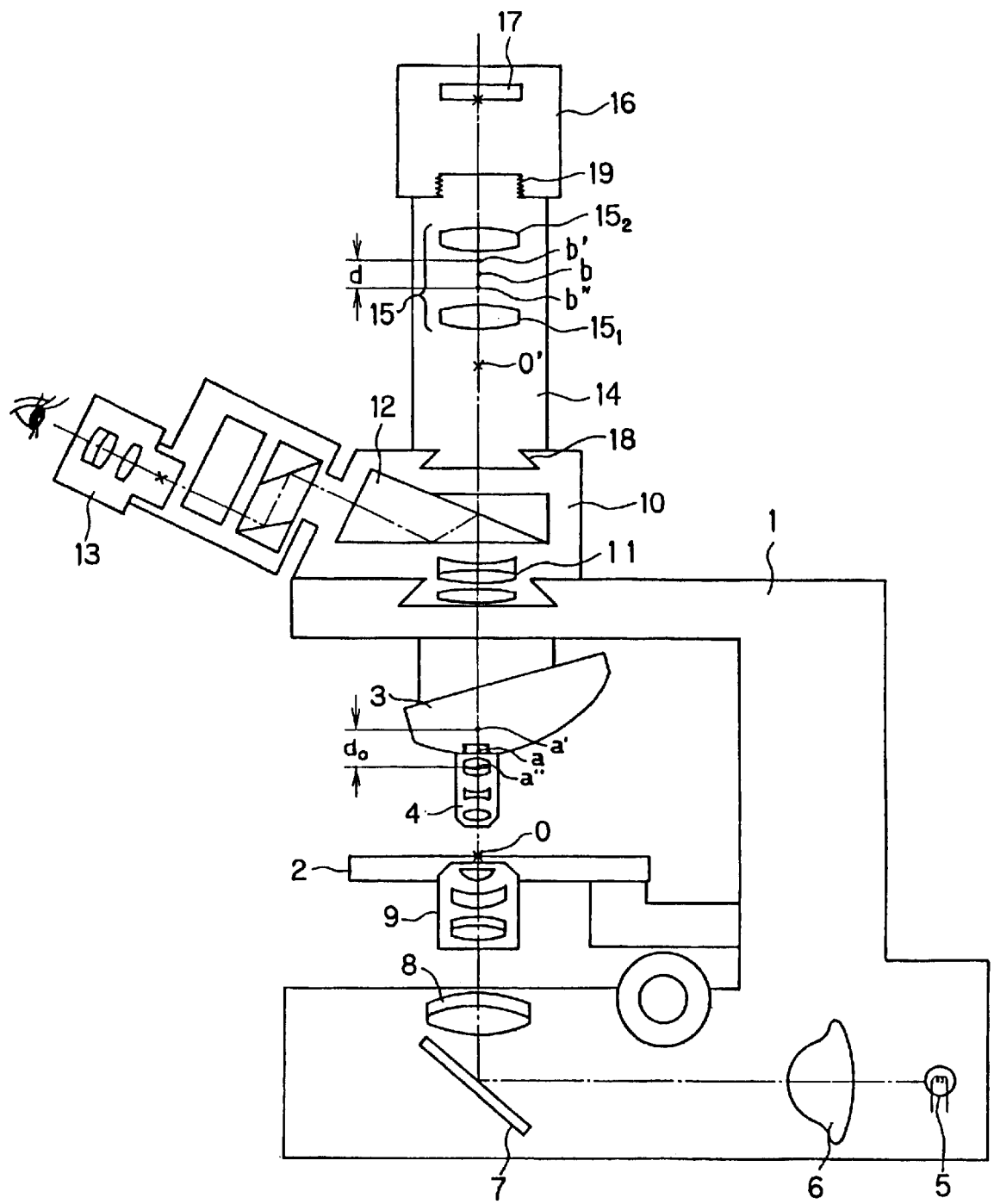
FIG. 4 shows the microscope of the present invention as well as the positions of exit pupils for different objective lens systems which may be rotated into the light path, as well as the images of these exit pupils which form secondary pupils.

As shown in FIG. 4, different microscope objective lens systems 4, positioned in the light path using the revolver 3, have exit pupils at different positions, such as a, a', a", etc. within the range $d_0$, depending upon their magnification and type. Accordingly, the secondary pupil positions can be at different positions b, b', b", etc., all within the range d shown in FIG. 4. Therefore, it is preferable that diaphragm 20 is not fixed relative to the relay lens system 15, but instead is movable within the range d or a slightly larger range. In this way, the position of the diaphragm can be adjusted to obtain the most even brightness over the field of view for each objective lens system 4 on the revolver 3. For ease of illustration, only one such objective lens system 4 has been shown in FIG. 4.

Figure 5A:
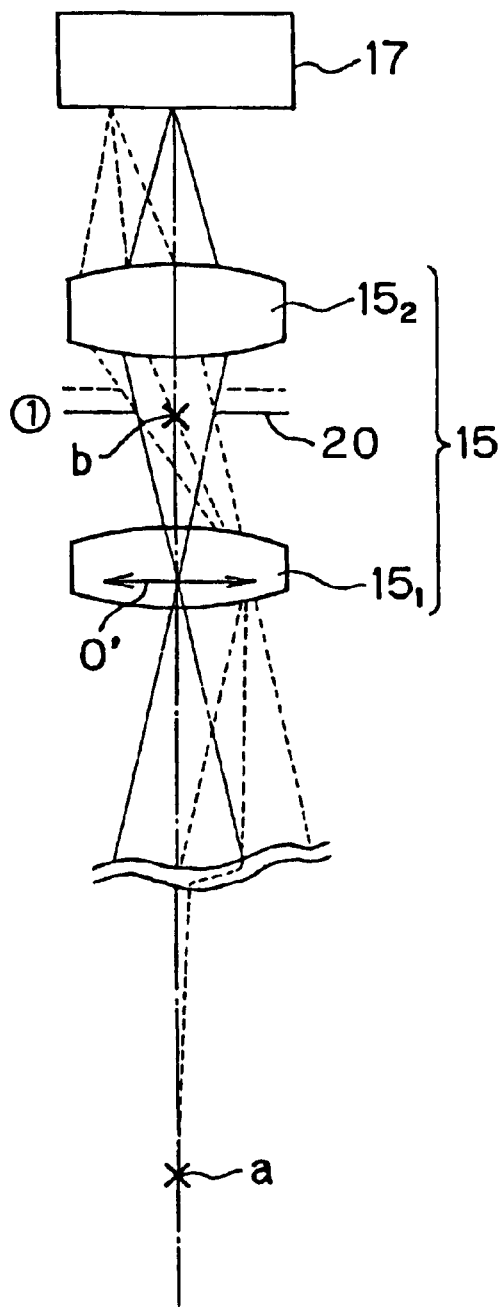
FIGS. 5A and 5B show optical paths through a middle barrel portion of a microscope in the case of using an objective lens system having an exit pupil at a (FIG. 5A) and one having an exit pupil at a' (FIG. 5B) for preventing brightness artifacts from occurring in the field of view by providing a movable diaphragm in the middle barrel portion.
Figure 5B:
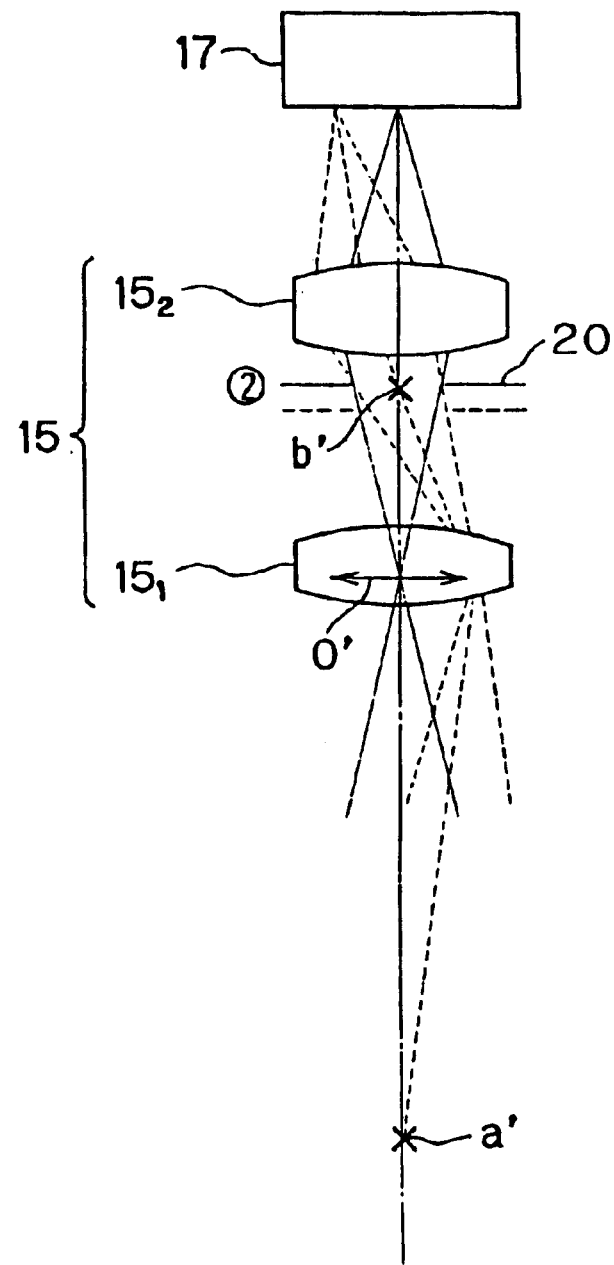

FIGS. 5A and 5B show the optical paths within the middle barrel 14 for the exit pupil being at a (FIG. 5A) and at a'

(FIG. 5B). In these figures, axial light flux is shown by solid lines and abaxial light flux is shown by dotted lines. In this case, among the two positive lenses $15_1$, $15_2$ of the relay lens system 15, the positive lens $15_1$ that is nearest the objective lens system 4 serves as a field lens. As described above, when the objective lens system 4 is replaced with, for instance, the objective lens system 4', the exit pupil position moves along the optical axis from a in FIG. 5A to a' in FIG. 5B. In this instance, the image O' of the sample O remains at a fixed position while the secondary pupil formed by the imaging lens 11 (FIG. 4) and the field lens $15_1$ is moved from b in FIG. 5A to b' in FIG. 5B. According to this, diaphragm 20 is moved from the position 1 (circled, in FIG. 5A) to the position 2 (circled, in FIG. 5B). This allows the simultaneous blocking of peripheral portions of the axial and abaxial light fluxes so that each has nearly the same numerical aperture. Consequently, images having reduced shading, and thus more even brightness, can be obtained for each objective lens system 4, 4'.

As shown in FIG. 5B, when the secondary pupil b' is relayed onto the electronic image-detecting device 17, the angles of incidence of the abaxial light flux, shown by dotted lines, increase. In such a case, instead of coinciding with that of the secondary pupil b', the position of the diaphragm 20 can be slightly shifted along the optical axis nearer the sample so that the angles of incidence onto the electronic image-detecting device 17 of the abaxial light flux do not increase.

The following construction allows the diaphragm 20 to have an aperture diameter and a position along the optical axis that is adjustable relative to the middle barrel 14. A diaphragm having a variable aperture is used for the diaphragm 20, and is held within the middle barrel 14 as follows. In addition to the barrel body, a cylindrical inner barrel is inserted in the barrel body. The outer diameter of the inner barrel and the inner diameter of the barrel body are made nearly equal, and the variable aperture diaphragm is mounted within the inner barrel. This construction allows the variable aperture diaphragm to be shifted along the optical axis by moving the inner barrel longitudinally relative to the middle barrel 14.

The moving range of the diaphragm 20 along the optical axis is determined as follows. Referring to FIG. 4, among the objective lens systems 4, 4', etc., which may be mounted on the revolver 3, the objective lens system having its exit pupil nearest the sample O, and the objective lens system having its exit pupil farthest from the sample O, are selected. These exit pupils are illustrated in FIG. 4 as a" and a', respectively. The conjugate points in the relay lens system 15 to these two exit pupils are then determined (i.e., conjugate points b" and b'). The distance between these two conjugate points is the minimum moving range of the diaphragm 20. As described above, the diaphragm 20 does not necessarily coincide with the secondary pupils b, b' (illustrated in FIGS. 5A and 5B), etc. Assuming that the optical system between the exit pupils a, a', etc. and the secondary pupils b, b', etc. (namely, the optical system consisting of the imaging lens 11 and the field lens $15_1$ in FIG. 4), has a lateral magnification of M, it is preferable that the moving range of the diaphragm 20 along the optical axis satisfies the following Condition (1):

$$d' < 1.1 M^2 d \qquad \text{Condition (1)}$$

where d' is the moving range of the diaphragm along the optical axis,

M is the lateral magnification of the optical system between the exit pupils a, a' and a" and the secondary pupils b, b', and b" (i.e., the optical system here consists of the imaging lens 111 and the field lens $15_1$ in FIG. 4), and d is the minimum moving range of the diaphragm 20 (i.e., the distance between b" and b', as illustrated in FIG. 4).

It is more preferable that the moving range of the diaphragm 20 along the optical axis satisfies the following Condition (1'):

$$d' < M^2 d \qquad \text{Condition (1)}$$

where d', M and d are as defined above.

Although the diaphragm 20 can have a fixed aperture diameter, a variable aperture diameter enables better reduction of unevenness of brightness artifacts, and is also desirable in order to optimize the resolution and contrast. For the maximum diameter of the adjustable aperture of the diaphragm 20, it is preferable that the following Condition (2) is satisfied:

$$D < 1.2 M\, D_1 \qquad \text{Condition (2)}$$

where

D is the maximum diameter of the adjustable aperture of the diaphragm 20,

M is as defined above, and $D_1$ is the largest exit pupil diameter among the exit pupils of the objective lens systems 4, 4', 4", etc.

This relationship allows the passage of the maximum light flux from the sample without needlessly partially blocking light from any of the objective lens systems 4, 4', 4", etc., thus preventing needless loss of light flux and the resulting lowering of brightness of the image. Instead of Condition (2), the following Condition (3) can be used, providing high precision in making and positioning of the components is maintained:

$$D < M\, D_1 \qquad \text{Condition (3)}$$

where

D, M and $D_1$ are as defined above.

The relationship between the numerical aperture NA of the light flux entering the electronic image-detecting device 17 (from the relay lens system 15) and the pixel diameter P (in nm) of the electronic image-detecting device 17 will now be considered in terms of resolution.

As is well-known, the diameter of the central spot of the Airy Disc that is formed by diffraction effects of the light flux incident onto the electronic image-detecting device 17 (assuming a circular stop) is given by Equation (1):

$$\Phi = 1.22\, \lambda/NA \qquad \text{Equation (1)}$$

where

Φ is the diameter of the Airy Disc,

λ is the wavelength (here assumed to be 550 nm), and

NA is the numerical aperture of the incident light flux.

If more than eight adjacent pixel elements of the electronic image-detecting device 17 are illuminated by the Airy Disc, the point spread function will be sampled at a higher spatial frequency than needed for its accurate determination. In other words, the detecting system will have a higher resolution than needed. Thus, $$1.22\, \lambda/NA \leq 8P \qquad \text{Inequality (1A)}$$

where

P is the distance between the centers of adjacent pixel elements, and $\lambda$, and NA are as defined above.

The above inequality can be written:

$$0.61/(2P) \leq 2NA/\lambda \qquad \text{Inequality (1B)}$$

where $\lambda$, NA and P are as defined above.

In other words, when $0.61/(2P)$ becomes larger than $2NA/\lambda$, the electronic image-detecting device 17 will have a higher resolution than needed to measure the resolution of the optical system.

On the other hand, if fewer than two adjacent pixel elements of the electronic image-detecting device 17 are illuminated by the Airy Disc, the point spread function will not be sampled at a sufficient spatial frequency for its accurate determination. Thus, $$1.22\, \lambda/NA \geq 2P \qquad \text{Inequality (2A)}$$

where $\lambda$, NA and P are as defined above.

Inequality (2A) can be written:

$$2NA/\lambda \leq 2.44/(2P) \qquad \text{Inequality (2B)}$$

where $\lambda$, NA and P are as defined above.

In other words, when $2NA/\lambda$ becomes larger than $2.44/(2P)$, the electronic image-detecting device 17 will have too low a resolution to accurately measure the resolution of the optical system. In conclusion, combining Inequality (1B) and (2B), it is desirable that the following Condition (4A) is satisfied:

$$0.61/(2P) \leq 2NA/\lambda \leq 2.44/(2P) \qquad \text{Condition (4A)}$$

where

P, NA and $\lambda$ are as defined above.

If the illumination incident the detecting surface is not limited by a circular stop or diaphragm, but is instead limited by an aperture with sides having straight lines, such as a rectangular stop or diaphragm, Condition (4A) does not apply. For example, if the diaphragm (i.e., stop) is rectangular, the diffraction pattern will be approximately the Fraunhofer diffraction pattern of a rectangular aperture, as is well known. (See, for example, pages 62–63 of *Introduction to Fourier Optics*, by Joseph W. Goodman, McGraw-Hill, 1968.) For such a rectangular stop or diaphragm, the following Condition (4B) applies:

$$0.50/(2P) \leq 2NA/\lambda \leq 2.00/(2P) \qquad \text{Condition (4B)}$$

where

P, NA and $\lambda$ are as defined above.

From the above, it is preferable that the following Condition (4C) is satisfied in using diaphragms of various shapes:

$$0.50/(2P) \leq 2NA/\lambda \leq 2.44/(2P) \qquad \text{Condition (4C)}$$

where

P, NA and $\lambda$ are as defined above.

Returning to the previous discussion, in FIGS. 5A and 5B, the exit pupil moves from the position a in FIG. 5A to the position a' in FIG. 5B, depending on the objective lens system that is revolved into the light path of the microscope. At the same time, the secondary pupil that is formed by the imaging lens 11 (see FIG. 4) and field lens 15$_1$ moves from the position b in FIG. 5A to the position b' in FIG. 5B. Thus the diaphragm 20 may be moved so as to maintain its position at or very near the axial position of the secondary pupil. Due to this axial movement of the diaphragm, the aperture diameter of the diaphragm 20 will need to be adjusted in order to balance the quantities of light in the axial and abaxial light fluxes so as to reduce the unevenness of brightness.

FIGS. 6A and 6B show optical paths through a middle barrel portion of a microscope in the case of using an objective lens system having an exit pupil at a (in FIG. 6A) and one having an exit pupil at a' (in FIG. 6B) for preventing brightness artifacts from occurring in the field of view by providing a movable field lens in the middle barrel portion. In these figures, axial light fluxes are shown by the solid lines and abaxial light fluxes are shown by the dotted lines. In this embodiment of the invention, among the two positive lenses 15$_1$, 15$_2$ of the relay lens system 15, the positive lens 15$_1$ that is nearest the objective lens system 4 serves as a field lens. When the objective lens system 4 is replaced with, for instance, the objective lens system 4', the exit pupil position is moved along the optical axis from a in FIG. 6A to a' in FIG. 6B. Here, the image O' of the sample O, that is formed by the objective lens systems 4, 4' and the imaging lens 11, is fixed (i.e., not moved by the exchange of the objective lens system 4). Therefore, the image of O' that is formed by the field lens 15$_1$ remains substantially stationary, whereas the secondary pupil b' (the image of the exit pupil a') moves along the optical axis. Therefore, the field lens 15$_1$ can be moved to form the secondary pupils b, b', and b" near the fixed diaphragm 20. This allows for the simultaneous blocking of the peripheral rays of both the axial and abaxial light fluxes by the diaphragm 20 so that images with less brightness unevenness over the field of view can be obtained for each objective lens system 4, 4', and 4".

FIGS. 7A and 7B show optical paths through the middle barrel in the case where the diaphragm 20 is not moved axially when the secondary pupils b, are adjusted. Instead, multiple diaphragms 20$_1$, 20$_2$, etc. are positioned at locations that nearly coincide in position with the secondary pupils b, b', etc. Here, an appropriate diaphragm 20$_1$, 20$_2$, etc. is selected for the objective lens systems 4, 4', etc. for simultaneously blocking the outer rays of the axial and abaxial light fluxes. When the objective lens system 4 is used and the exit pupil is at the position a, as shown in FIG. 7A, the diaphragm 20$_1$ is positioned at the secondary pupil b with its adjustable aperture used to block the peripheral rays. The other diaphragm 20$_2$ is maintained with its aperture open so as to not block any of the light flux. When the objective lens system 4' is placed in the light path and the exit pupil is at a', as in FIG. 7B, the diaphragm 20$_2$, positioned at the secondary pupil b', is used with its adjusted aperture blocking peripheral rays and with the diaphragm 20$_1$ being maintained with its aperture open so as to not block any of the light flux.

Although FIGS. 7A and 7B illustrate only two diaphragms 20$_1$ and 20$_2$, more than two diaphragms can be used, if necessary. The diaphragm 20, used in the embodiments above, can be a diaphragm having a continuously adjustable aperture such as an iris diaphragm. Alternatively, a diaphragm having an electrically adjustable transparent region, such as a liquid crystal device, can be used. In embodiments where the diaphragm 20 is at a fixed position, the diaphragm 20 may, instead of having an adjustable transparent region described above, consist of plural aperture plates having different aperture diameters that are used in turn, or it may have an aperture plate with apertures of different diameters, wherein the plate can be adjusted in position crosswise to the optical path so that the diameter of an aperture inserted in the optical path is changed. The control of the apertures and the position of the diaphragm 20 along the optical axis will now be explained.

Figure 8:
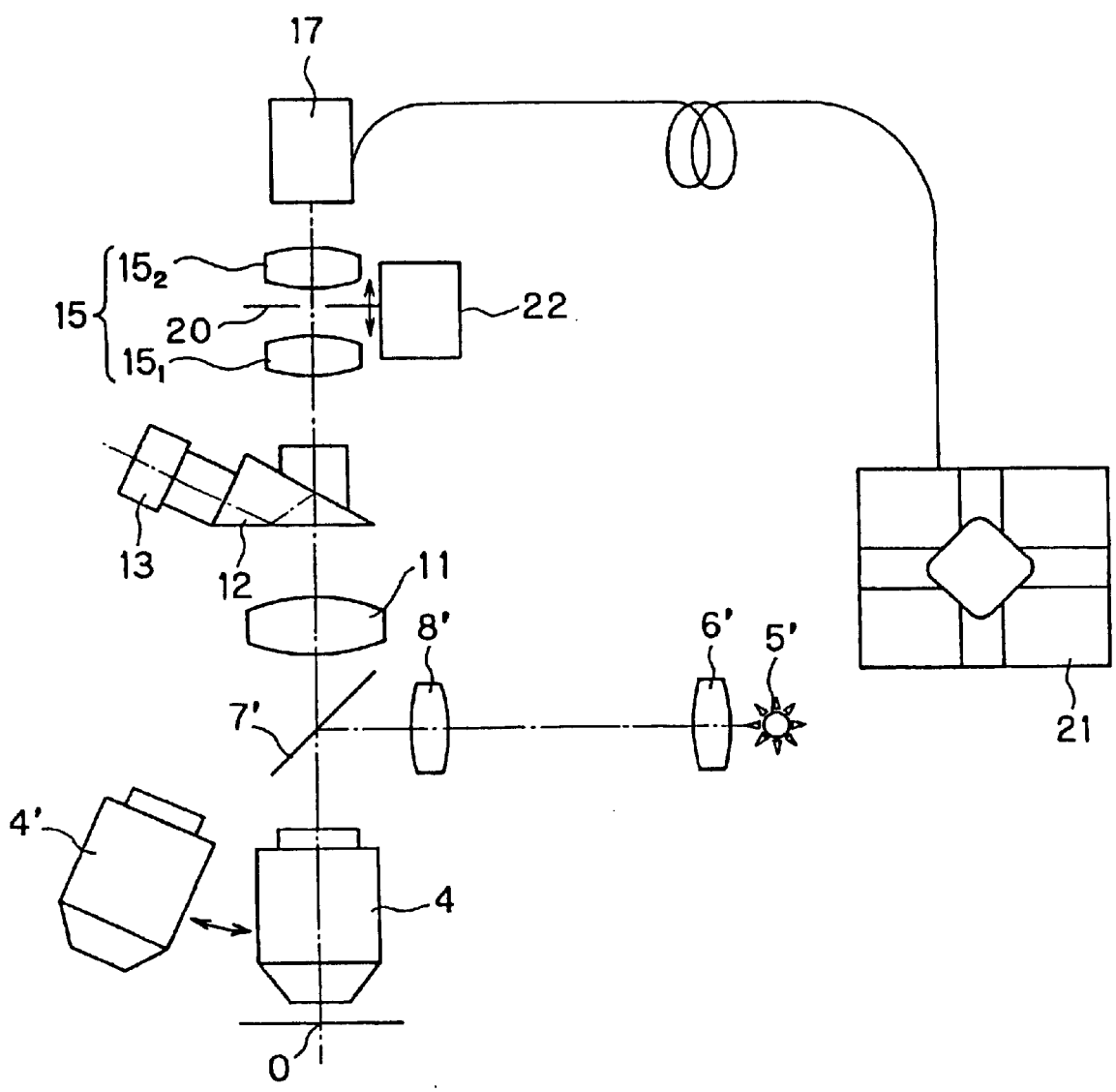
FIG. 8 shows the construction of an embodiment of the invention which manually controls the aperture size of a diaphragm and its position along the optical axis.

FIG. 8 shows the construction of a manually controlled diaphragm. The diaphragm 20 is provided with an aperture diameter and position control mechanism 22 for controlling the diameter of an aperture and the position of an aperture along the optical axis. The aperture diameter can be adjusted by, for instance, a control mechanism 22 that independently controls the aperture diameter of the diaphragm and the position of the diaphragm along the optical axis. Such control mechanisms are well-known in the art. A connection is made so as to input image signals of the sample O to a monitor 21 in order to view enlarged images that are obtained from the electronic image-detecting device 17. In this configuration, by observing enlarged images of the sample O that are displayed on the monitor 21, a viewer can operate the aperture diameter and position control mechanism 22 in order to adjust the aperture diameter as well as the position of the diaphragm 20 along the optical axis so as to obtain images with the least unevenness of brightness and so as to have excellent resolution. Here, if a surface with constant reflectivity (such as a mirror) is used as the sample O when adjusting the unevenness of brightness, the adjustment can be performed more easily.

Figure 9:
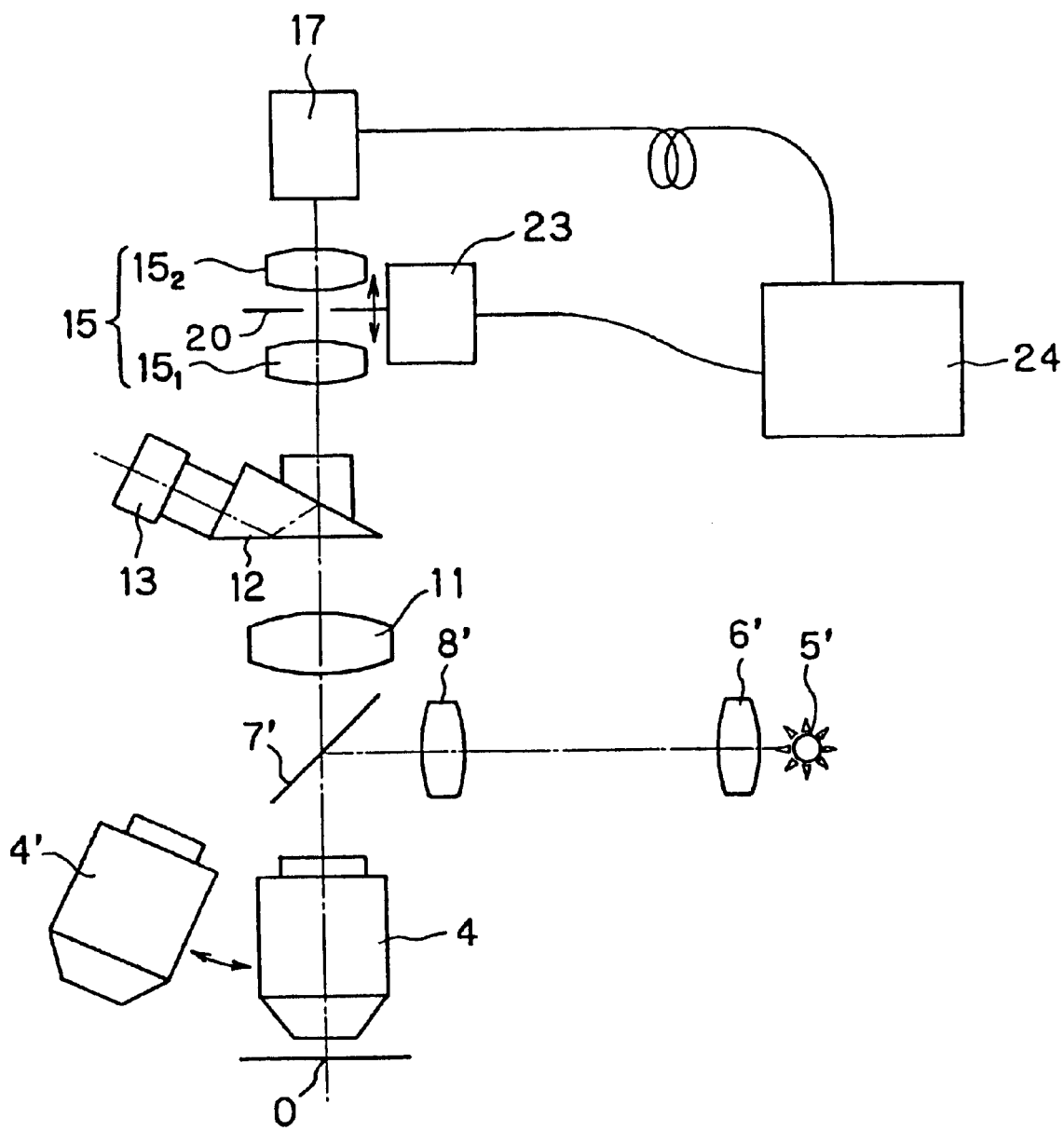
FIG. 9 shows the construction of an embodiment of the invention for automatically controlling the aperture size of a diaphragm and its position along the optical axis.

FIG. 9 shows the construction of an embodiment in which the aperture diameter and the position along the optical axis of the diaphragm 20 are automatically adjusted. Diaphragm 20 is provided with an aperture diameter and position control mechanism 23 for controlling its aperture and position along the optical axis based on a signal provided from an external source. Signals for enlarged images of the sample O obtained from the electronic image-detecting device 17 are input into a processing unit 24. The processing unit 24 calculates the relative difference in light quantity between the central and peripheral areas based on the image signals obtained from the electronic image-detecting device 17, and sends a signal to the control mechanism 23 indicating the position of the diaphragm 20 for canceling the difference. Meanwhile, the processing unit 24 calculates the brightness of the image and sends a signal to the control mechanism 23 indicating the proper aperture diameter for the diaphragm 20. The control mechanism 23 adjusts the aperture diameter and position of the diaphragm 20 based on the signals indicating the aperture diameter and position of the diaphragm sent from the processing unit 24.

The invention being thus described, it will be obvious that the same may be varied in many ways. For example, a combination of positional adjusting of the diaphragm 20 and of the field lens $15_1$ along the optical axis can be used. Also, the number of objective lens systems that may be included on the revolver is not limited to those listed in the previous embodiments. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device;

a control member having a light transmissive region and a light blocking region outside the light transmissive region, and said control member is positioned in an optical path at or near a conjugate position of an exit pupil of the optical imaging system so as to reduce artifacts in an image detected by the electronic image-detecting device;

a display unit for displaying images detected by the image-detecting device; and a processing unit for transmitting a signal from the image-detecting device to the control mechanism, said signal for correcting unevenness of brightness of the abaxial versus the axial light fluxes in the displayed images;

wherein a control mechanism is provided for controlling at least one of the axial position of the control member or the size of the light transmissive region of the control member;

the control mechanism moves the control member along the optical axis;

the optical imaging system has plural objective lens systems that are interchangeable for use;

among the objective lens systems that may be used with the microscope, the control member has a minimum moving range along the optical axis from a conjugate position of the objective lens system having an exit pupil that is nearest the sample, to the conjugate position of the objective lens system having an exit pupil that is farthest from the sample; and the control member has a moving range along the optical axis satisfying the following Condition (1):

$$d' < 1.1\, M^2\, d \qquad \text{Condition (1)}$$

where d' is the moving range of the control member along the optical axis,

M is the lateral magnification of the optical system components that lie between the exit pupils and the secondary exit pupils, and d is the minimum moving range of the control member.

2. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device; and, a control member having a light transmissive region and a light blocking region outside the light transmissive region, and said control member is positioned in an optical path at or near a conjugate position of an exit pupil of the optical imaging system so as to reduce artifacts in an image detected by the electronic image-detecting device;

wherein a control mechanism is provided for controlling at least one of the axial position of the control member or the size of the light transmissive region of the control member;

the control mechanism changes the size of the light transmissive region of the control member; and the optical imaging system has plural objective lens systems that are interchangeable for use and the control member has a maximum light transmissive region dimension satisfying the following Condition (2):

$$D < 1.2\, M\, D_1 \qquad \text{Condition (2)}$$

where

D is the maximum light transmissive region dimension of the control member,

M is the lateral magnification of the optical system components that lie between the exit pupils and the secondary exit pupils, and $D_1$ is the largest exit pupil diameter among the exit pupils of the objective lens systems.

3. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device; and, a control member having a light transmissive region and a light blocking region outside the light transmissive region, and said control member is positioned in an optical path so as to reduce artifacts in an image detected by the electronic image-detecting device;

wherein a control mechanism is provided for controlling at least one of the axial position of the control member or the size of the light transmissive region of the control member;

the control mechanism changes the size of the light transmissive region of the control member; and the transmissive region of the control member is circular in shape, and the following Condition (4A) is satisfied:

$$0.61/(2P) \leq 2NA/\lambda \leq 2.44/(2P) \qquad \text{Condition (4A)}$$

where $\lambda$ is the wavelength of the incident light,

NA is the numerical aperture of the incident light flux, and

P is the distance between the centers of adjacent pixel elements.

4. A microscope comprising:

an optical imaging system which includes an objective lens system;

an electronic image-detecting device;

an optical relay system, positioned between the optical imaging system and the electronic image-detecting device, which relays an image of a sample onto the electronic image-detecting device; and, a control member having a light transmissive region and a light blocking region outside the light transmissive region, and said control member is positioned in an optical path so as to reduce artifacts in an image detected by the electronic image-detecting device;

wherein a control mechanism is provided for controlling at least one of the axial position of the control member or the size of the light transmissive region of the control member;

the control mechanism changes the size of the light transmissive region of the control member; and the light transmissive region of the control member has sides with straight line segments, and the following Condition (4B) is satisfied:

$$0.5/(2P) \leq 2NA/\lambda \leq 2/(2P) \qquad \text{Condition (4B)}$$

where $\lambda$ is the wavelength of the incident light,

NA is the numerical aperture of the incident light flux, and

P is the distance between the centers of adjacent pixel elements.

5. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device;

a control member having a light transmissive region and a light blocking region outside the light transmissive region, and said control member is positioned in an optical path at or near a conjugate position of an exit pupil of the optical imaging system so as to reduce artifacts in an image detected by the electronic image-detecting device;

a display unit for displaying images detected by the image-detecting device; and a processing unit for transmitting a signal from the image-detecting device to the control mechanism, said signal for correcting unevenness of brightness of the abaxial versus the axial light fluxes in the displayed images;

wherein a control mechanism is provided for controlling at least one of the axial position of the control member or the size of the light transmissive region of the control member;

the control mechanism moves the control member along the optical axis; and the optical imaging system has plural objective lens systems that are interchangeable for use, and the control member has a moving range along the optical axis satisfying the following Condition (1'):

$$d' < M^2\, d \qquad \text{Condition (1')}$$

where d' is the moving range of the control member along the optical axis,

M is the lateral magnification of those optical system components that lie between the exit pupils and the secondary exit pupils, and d is the minimum moving range of the control member.

6. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device; and, a control member having a light transmissive region and a light blocking region outside the light transmissive region, and said control member is positioned in an optical path at or near a conjugate position of an exit pupil of the optical imaging system so as to reduce artifacts in an image detected by the electronic image-detecting device;

wherein a control mechanism is provided for controlling at least one of the axial position of the control member or the size of the light transmissive region of the control member;

the control mechanism changes the size of the light transmissive region of the control member; and the optical imaging system has plural objective lens systems that are interchangeable for use, and the control member has a maximum light transmissive region dimension satisfying the following Condition (3):

$$D < M\, D_1 \qquad \text{Condition (3)}$$

where

D is the maximum light transmissive region dimension of the control member,

M is the lateral magnification of the optical system components that lie between the exit pupils and the secondary exit pupils, and $D_1$ is the largest exit pupil diameter among the exit pupils of the objective lens systems.

7. A microscope comprising:

an optical imaging system which includes an objective lens system;

an electronic image-detecting device;

an optical relay system, positioned between the optical imaging system and the electronic image-detecting device, which relays an image of a sample onto an electronic image-detecting device; and, a control member having a light transmissive region and a light blocking region outside the light transmissive region, and said control member is positioned in an optical path so as to reduce artifacts in an image detected by the electronic image-detecting device;

wherein a control mechanism is provided for controlling at least one of the axial position of the control member or the size of the light transmissive region of the control member;

the control mechanism changes the size of the light transmissive region of the control member; and the following Condition (4C) is satisfied:

$$0.50/(2P) \leq 2NA/\lambda \leq 2.44/(2P) \qquad \text{Condition (4C)}$$

where $\lambda$ is the wavelength of the incident light,

NA is the numerical aperture of the incident light flux, and

P is the distance between the centers of adjacent pixel elements.

* * * * *